March 20, 1928.  
G. W. CURTIS  
1,663,003  
CONVEYER ROLLER  
Filed March 2, 1925
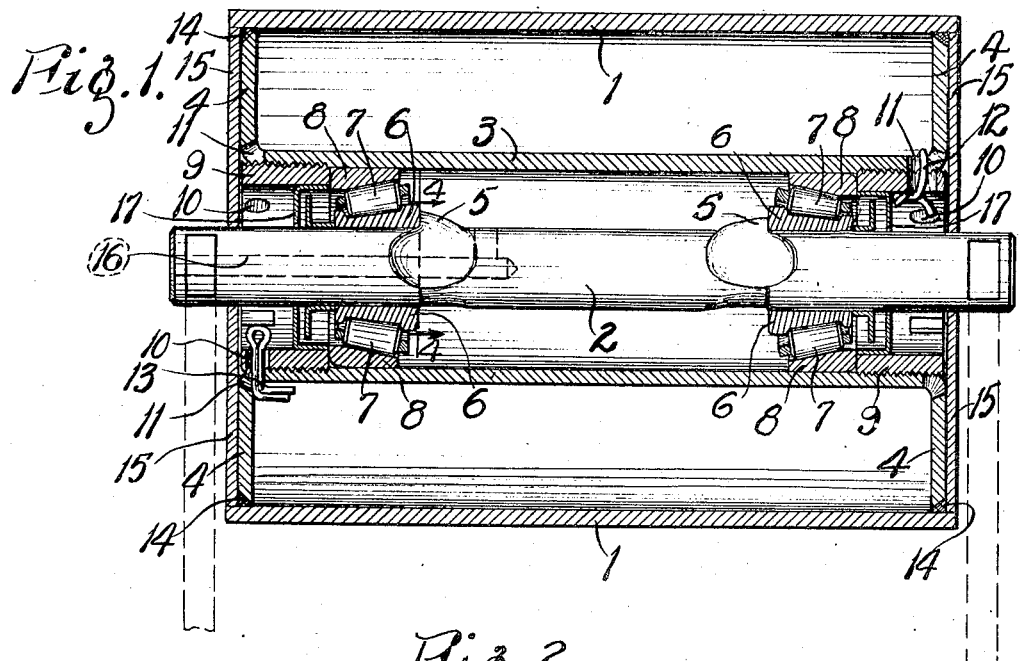
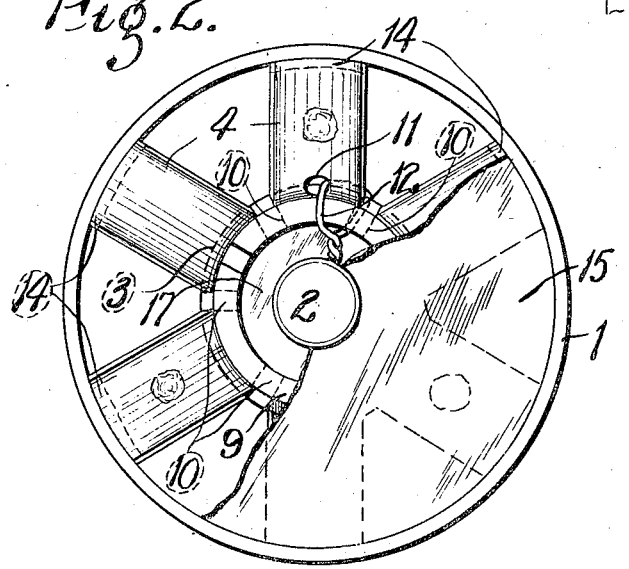
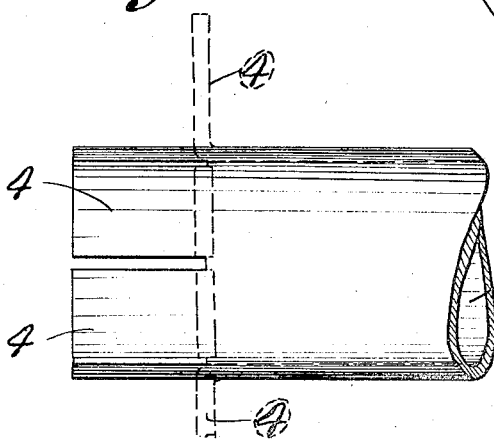
INVENTOR:  
George W. Curtis  
by his ATTORNEYS Patented Mar. 20, 1928.

1,663,003

UNITED STATES PATENT OFFICE.

GEORGE W. CURTIS, OF CANTON, OHIO, ASSIGNOR TO THE TIMKEN ROLLER BEARING COMPANY, OF CANTON, OHIO, A CORPORATION OF OHIO.

CONVEYER ROLLER.

Application filed March 2, 1925. Serial No. 12,563.

My invention relates to conveyer rollers and has for its principal object to produce a roller for belt and other conveyer that will be extremely light in construction and that will be easily adapted for use with roller bearings.

The invention consists principally in providing a hollow conveyer roller with an inner tubular member that provides a chamber within which roller bearings may be mounted, said tubular member having flanged end portions preferably in the form of spoke-like members, that are secured to the roller, as by welding. The invention further consists in the conveyer roller and in the parts and combinations of parts hereinafter described and claimed.

In the accompanying drawing which forms part of this specification and wherein like reference numerals indicate like parts wherever they occur, Fig. 1 is a longitudinal sectional view of a conveyer roller embodying my invention;

Fig 2 is an end view;

Fig. 3 is a diagrammatic view illustrating the process of forming the spoke-like members on the ends of the tubular member; and Fig 4 is a fragmentary sectional view on the line 4—4 of Fig. 1 showing the abutments on the roller shaft for the roller bearing cone.

A hollow conveyer roller 1 for a belt or other conveyer is rotatably mounted on a shaft 2. Mounted in the roller 1 is a tubular shell member 3 that has end portions 4 that are secured to the inside of the roller, as by welding.

The shaft 2 is provided with upstanding lugs or shoulders 5 that constitute abutments for the cones 6 or inner bearing members of conical roller bearings. The conical rollers 7 are disposed on said cones 6; and the cups 8 or outer bearing members therefor are disposed in the bore of the tubular member 3. Annular adjusting nuts 9 are threaded into the ends of the bore of the tubular member 3 and abut against the ends of the respective cups 8. The positions of the cups may be adjusted by rotating said nuts 9. Preferably the nuts are provided with holes 10 therethrough at intervals and the tubular member 3 is provided with one or more holes 11 at each end, as at the juncture between the body portion of the tube and the end. The adjusting nuts 9 may be held in position by means of wires 12 or cotter pins 13 passing through one of the holes in the adjusting nut and a hole in a tubular member.

Preferably the tubular inner member 3 is made by slotting the ends of a cylindrical tube as shown in Figure 3. The end pieces 4 between the slots are then bent up substantially perpendicular with the axis of the tube to form spoke-like members 4. The tubular member is then inserted in the roller and the ends of the spokes 4 secured to the roller as by welding as indicated at 14 in the drawing.

Preferably an annular washer 15 is secured in each end of the roller, as by being welded to a plurality of spokes 4. The opening in the washer is slightly larger than the shaft 2, whereby the washer excludes dirt from the roller. The washer is easily removed when it is desired to adjust a bearing.

The shaft is provided with a bore 16 through part of its length, permitting entry of lubricant to the bearings and suitable lubricant retainers 17 are provided.

The above described construction has numerous advantages. It is light and at the same time strong and durable. It is easily made and assembled and it is especially adapted for use with anti-friction bearings, such as roller bearings.

Obviously numerous changes may be made without departing from the invention and I do not wish to be limited to the precise construction shown.

What I claim is:

1. A shaft, an elongated hollow roller rotatably mounted on said shaft, an elongated tubular member in said roller, and anti-friction bearings interposed between said tubular member and said shaft, said tubular member having radially extending spoke members at its ends made by bending the portions between slots in said tubular member that extend longitudinally from the ends thereof, and said spoke members being secured to said roller, at the end portions thereof.

2. A shaft, an elongated hollow roller rotatably mounted on said shaft, an elongated tubular member in said roller, and anti-friction bearings interposed between said tubular member and said shaft, said tubular member having radially extending spoke members at its ends made by bending the portions between slots in said tubular member that extend longitudinally from the ends thereof and said spoke members being secured to said roller, and an annular washer in each end of said roller abutting against said spoke members, and substantially filling the space between the inner periphery of said roller and said shaft.

3. A shaft, an elongated hollow roller rotatably mounted on said shaft, an elongated tubular member in said roller, and anti-friction bearings interposed between said tubular member and said shaft, said tubular member having radially extending spoke members made by bending the portions between slots in said tubular member that extend longitudinally from the ends thereof and said spoke members being secured to said roller, and an annular washer in each end of said roller abutting against said spoke members and secured to a plurality thereof, and substantially filling the space between the inner periphery of said roller and said shaft.

4. An elongated hollow conveyer roller and an elongated tubular shell extending therethrough, the ends of said shell being slit longitudinally and bent radially thereby forming outwardly extending spoke members whose ends are welded to the inner surface of said roller near the ends thereof.

5. An elongated hollow conveyer roller and an elongated tubular shell extending therethrough, the ends of said shell being slit longitudinally and bent radially thereby forming outwardly extending spoke members whose ends are welded to the inner surface of said roller, and an annular washer in each end of said roller abutting against said spoke members and closing the end of said roller.

6. A shaft, a hollow roller rotatably mounted on said shaft, roller bearing cups in the ends of said roller, roller bearing cones on said shaft and conical rollers interposed between said cups and cones, said shaft having upstanding spaced lugs struck up from the metal of the shaft, against which lugs said cones abut.

7. A shaft, a hollow roller rotatably mounted on said shaft, roller bearing cups in the ends of said roller, roller bearing cones on said shaft, conical rollers interposed between said cups and cones, said shaft having upstanding spaced lugs struck up from the metal of the shaft, against which lugs said cones abut, and means for adjusting said bearing cups.

8. A shaft, hollow roller rotatably mounted on said shaft, an elongated tubular member extending through said roller, roller bearing cups in the ends of said tubular member, roller bearing cones on said shaft, conical rollers interposed between said cups and cones, said shaft having upstanding spaced lugs struck up from the metal of the shaft, against which lugs said cones abut, and adjusting nuts for said bearing cups threaded into the ends of said tubular member.

9. A shaft, an elongated hollow roller rotatably mounted on said shaft, an elongated tubular member extending through said roller, roller bearing cups in the ends of said tubular member, roller bearing cones on said shaft, conical rollers interposed between said cups and cones, said shaft having upstanding lugs against which said cones abut, and adjusting nuts for said bearing cups threaded into the ends of said tubular member, said tubular member having radially extending spoke members at its ends made by bending the portions between slots in said tubular member that extend longitudinally from the ends thereof and said spoke members being secured to said roller at the end portions thereof.

Signed at Canton, Ohio, this 17th day of February, 1925.

GEORGE W. CURTIS.